No. 620,634. Patented Mar. 7, 1899.
H. BASSETT.
COW HOPPLE.
(Application filed Sept. 24, 1898.)
(No Model.)
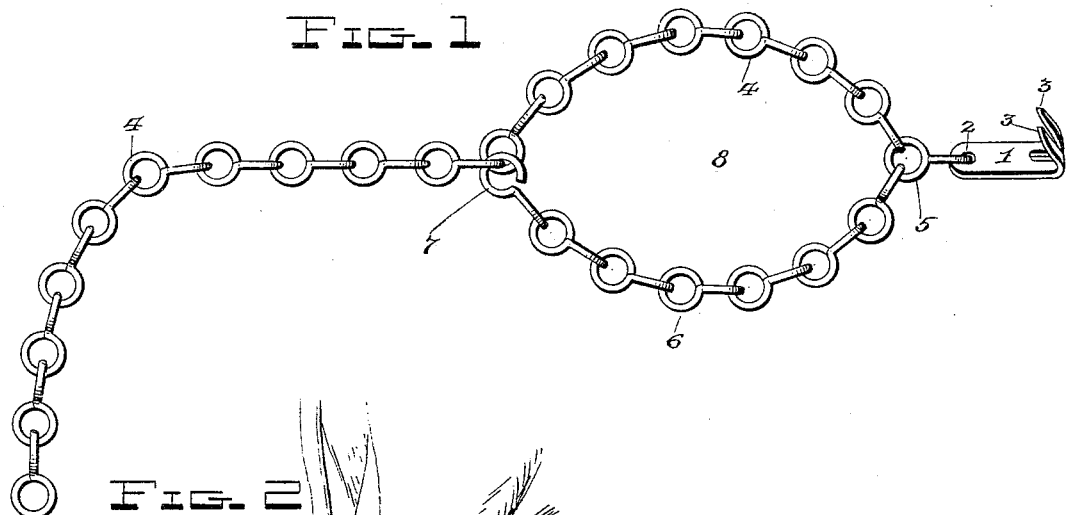
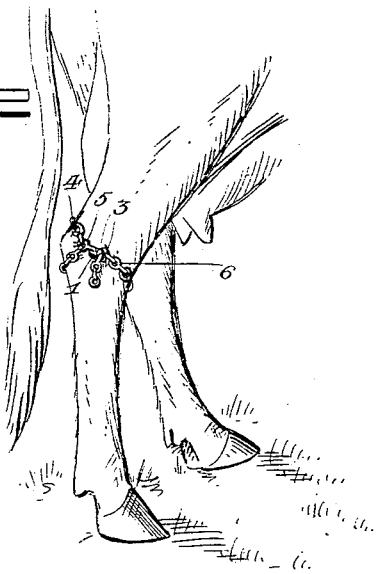
Inventor
Henry Bassett,
Witnesses

United States Patent Office.

HENRY BASSETT, OF SALEM, NEW JERSEY.

COW-HOPPLE.

SPECIFICATION forming part of Letters Patent No. 620,634, dated March 7, 1899.

Application filed September 24, 1898. Serial No. 691,822. (No model.)

*To all whom it may concern:*

Be it known that I, HENRY BASSETT, a citizen of the United States, residing at Salem, in the county of Salem and State of New Jersey, have invented certain new and useful Improvements in Cow-Hopples; and I do declare the following to be a full, clear, and exact description of the invention, such as will enable others skilled in the art to which it appertains to make and use the same.

My invention relates to a cow-hopple; and the object is to provide a simple, inexpensive, and effective device of this character.

To this end the invention consists in the construction, combination, and arrangement of the device, as will be hereinafter more fully described, and particularly pointed out in the claim.

The same reference characters indicate the same parts of the invention in the accompanying drawings.

Figure 1 is a perspective view of my improved hopple. Fig. 2 is a similar view showing it applied to a cow's leg.

1 denotes a claw-plate formed with an eye 2 at one end and with the claws 3 3 at the other.

4 denotes a chain, having its end link 5 fixed in the eye 2. 6 denotes a second shorter chain, having one end fixed in the link 5 and its free end terminating in an open link 7, which may be adjustably secured in any of the links of the chain 4, so as to form a loop 8.

In order to hobble the animal, the loop 8 is placed around the joint of one of the hind legs, as shown in Fig. 2, and the free end of the chain brought around in front of the leg and secured in the claw-plate, so as to prevent the animal bending this leg.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

In combination, the claw-plate, 1, formed with the eye 2 and claws 3 3, the chain 4 having one end secured in the eye 2 and the shorter chain 6 having one end fixed in the link of the chain, secured to the claw-plate and its free end terminating in a hook adapted to be secured in one of the intermediate links of the chain 4, substantially as shown and described.

In testimony whereof I have hereunto set my hand in the presence of two subscribing witnesses.

HENRY BASSETT.

Witnesses:
 CLINTON BASSETT,
 WILLIAM L. BASSETT.